US010223846B2

(12) United States Patent
Vala et al.

(10) Patent No.: US 10,223,846 B2
(45) Date of Patent: Mar. 5, 2019

(54) AERIAL VEHICLE ENGINE HEALTH PREDICTION

(71) Applicant: General Electric Company, Schenedtady, NY (US)

(72) Inventors: Ayin Mokri Vala, Santa Clara, CA (US); Scott Victor Hannula, Groveland, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/289,266

(22) Filed: Oct. 10, 2016

(65) Prior Publication Data

US 2018/0102000 A1 Apr. 12, 2018

(51) Int. Cl.
*G07C 5/08* (2006.01)
*B64D 45/00* (2006.01)
*G06N 3/08* (2006.01)
*G06N 7/00* (2006.01)

(52) U.S. Cl.
CPC .......... *G07C 5/0808* (2013.01); *B64D 45/00* (2013.01); *G06N 3/08* (2013.01); *B64D 2045/0085* (2013.01); *G06N 3/082* (2013.01); *G06N 3/084* (2013.01); *G06N 7/005* (2013.01)

(58) Field of Classification Search
None
See application file for complete search history.

(56) References Cited

U.S. PATENT DOCUMENTS

| 8,600,917 B1 | 12/2013 | Schimert et al. | |
|---|---|---|---|
| 2004/0176901 A1* | 9/2004 | Uluyol | F02C 9/00 701/100 |
| 2006/0089761 A1* | 4/2006 | Pettigrew | B64C 27/06 701/14 |
| 2009/0138423 A1* | 5/2009 | Nwadiogbu | G05B 23/0213 706/46 |
| 2016/0272342 A1* | 9/2016 | McCollough | B64C 27/04 |
| 2017/0259942 A1* | 9/2017 | Ziarno | B64D 45/00 |
| 2018/0025557 A1* | 1/2018 | Steinert | G07C 5/085 |

OTHER PUBLICATIONS

Brotherton, Jahns, Jacobs and Wroblewski, "Prognosis of Faults in Gas Turbine Engines", Proceedings of the IEEE Aerospace Conference, IEEE, New York, vol. 6, p. 163-171, 2000 (Year: 2000).*

(Continued)

*Primary Examiner* — Tamara L Weber
(74) *Attorney, Agent, or Firm* — General Electric Company; William Andes

(57) ABSTRACT

Systems and methods for modeling engine health are provided. One example aspect of the present disclosure is directed to a method for modeling engine health. The method includes receiving, by one or more processors, engine acceptance test procedure (ATP) data. The method includes receiving, by the one or more processors, flight test data. The method includes generating, by the one or more processors, one or more coefficients for a power assistance check (PAC) based on the engine ATP data and the received flight test data using a machine learning technique. The method includes transmitting, by the one or more processors, the one or more coefficients for the PAC to a vehicle, wherein the vehicle uses the one or more coefficients in the PAC to predict engine health.

20 Claims, 5 Drawing Sheets

(56) References Cited

OTHER PUBLICATIONS

Schwabacher, "A Survey of Data-Driven Prognostics", Proc. AIAA Infotech@Aerospace Conf., AIAA 2005-7002, Arlington, VA, 2005 (Year: 2005).*
West and Harrison, "Monitoring and Adaptation in Bayesian Forecasting Models", Journal of the American Statistical Association, vol. 81, No. 395, p. 741-750, 1986 (Year: 1986).*
Schimert and Wineland, "Coupling a Dynamic Linear Model with Random Forest Regression to Estimate Engine Wear", Annual Conference of the Prognostics and Health Management Society, 2010 (Year: 2010).*
Huang, Xi, Li, Liu, Qiu and Lee, "Residual life predictions for ball bearings based on self-organizing map and back propagation neural network methods", Mechanical Systems and Signal Processing, p. 193-207, 2007 (Year: 2007).*

* cited by examiner

AERIAL VEHICLE ENGINE HEALTH PREDICTION

FIELD OF THE INVENTION

The present subject matter relates generally to aviation systems.

BACKGROUND OF THE INVENTION

An aerial vehicle can include one or more engines. The one or more engines can be used to propel the aerial vehicle. The performance of the one or more engines can suffer from wear and tear. When the performance of the one or more engines suffers, operation of the aerial vehicle can present challenges. As such, systems for monitoring and/or assessing the health of aircraft engines can be useful.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a method for modeling engine health. The method includes receiving, by one or more processors, engine acceptance test procedure (ATP) data. The method includes receiving, by the one or more processors, flight test data. The method includes generating, by the one or more processors, one or more coefficients for a power assistance check (PAC) based on the engine ATP data and the received flight test data using a computer automated training process. The method includes transmitting, by the one or more processors, the one or more coefficients for the PAC to a vehicle. The vehicle uses the one or more coefficients in the PAC to predict engine health.

Another example aspect of the present disclosure is directed to a system for modeling engine health. The system includes a memory device. The system includes one or more processors. The one or more processors are configured to receive engine acceptance test procedure (ATP) data. The one or more processors are configured to receive flight test data. The one or more processors are configured to generate one or more coefficients for a power assistance check (PAC) based on the engine ATP data and the received flight test data using a machine learning technique. The one or more processors are configured to transmit the one or more coefficients for the PAC to a vehicle. The vehicle uses the one or more coefficients in the PAC to predict engine health.

Another example aspect of the present disclosure is directed to an aerial vehicle. The aerial vehicle includes a memory device. The aerial vehicle includes one or more processors. The one or more processors are configured to accumulate flight test data during a flight. The one or more processors are configured to transmit the flight test data to a cloud computing environment. The cloud computing environment is configured to generate one or more coefficients for a power assistance check (PAC) based on the received flight test data using a machine learning technique. The one or more processors are configured to receive the one or more coefficients. The one or more processors are configured to predict engine health based on the one or more coefficients in the PAC.

Other example aspects of the present disclosure are directed to systems, methods, aircrafts, avionics systems, devices, non-transitory computer-readable media for modeling engine health. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
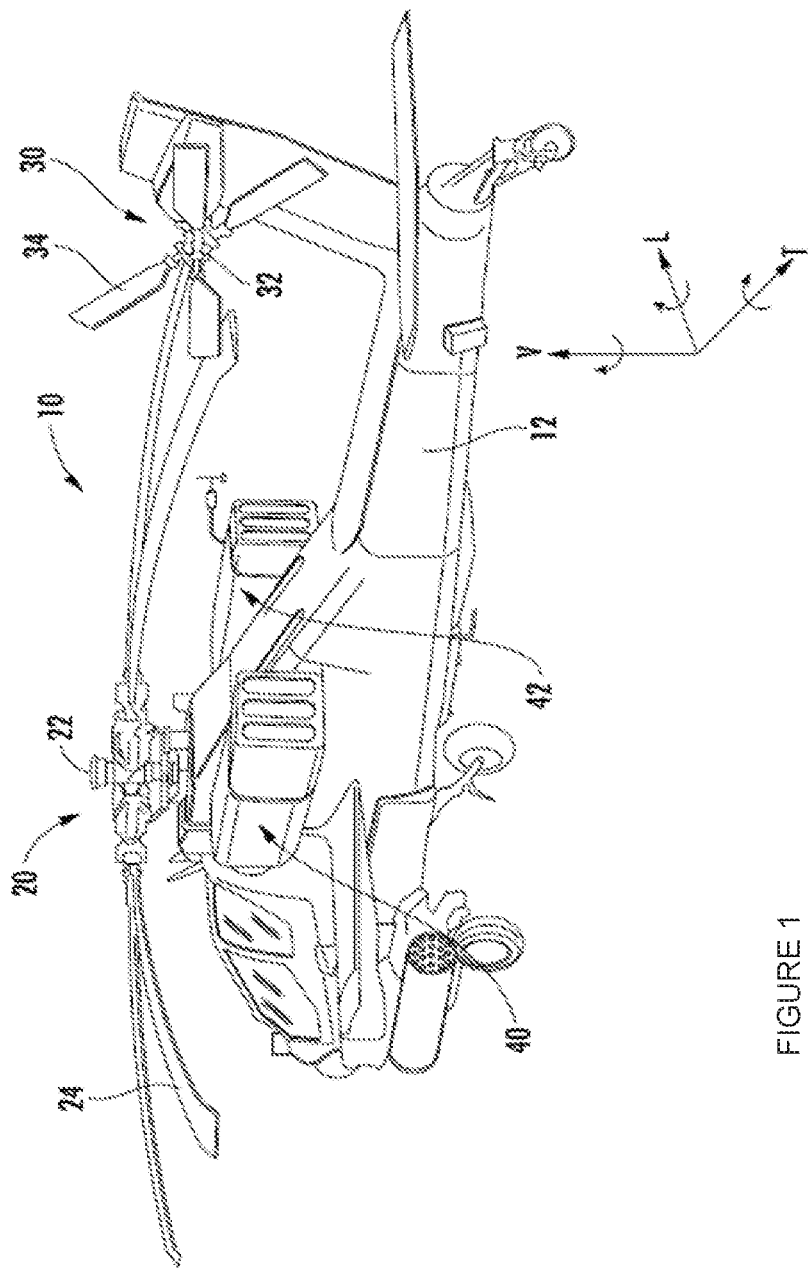
FIG. 1 is a schematic cross-sectional view of an aircraft in accordance with one embodiment of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

Example aspects of the present disclosure are directed to methods and systems that can model engine health. For instance, a power assurance check (PAC) can be used to check the engine health of the one or more engines. A PAC includes an equation or other model or algorithm that takes one or more parameters, such as ambient temperature, pressure altitude, engine torque, power turbine shaft rotational speed, engine measured turbine inlet temperature, and/or indicated airspeed, and converts the parameters into an output. The output can be a temperature margin. A temperature margin can be a calculated turbine inlet temperature subtracted from a maximum allowed turbine inlet temperature. If the output of the equation is outside of an acceptable range, then the PAC can determine that the engine's health is failing. For example, in an embodiment, if the temperature margin is zero, then a notification to remove the engine for maintenance can be generated. Additionally, the PAC can associate temperature margins with time to identify trends, such as sudden changes in engine health.

Machine learning or other automated computing technique can be used to determine coefficients to tailor the PAC for a particular engine. Flight data for the engine can be captured and analyzed to better determine what coefficients should be used for the engine. Traditionally, computation of the coefficients can take many weeks. Therefore, traditionally, the coefficients have only been recalculated when a problem with the PAC is detected. However, with the methods and systems described herein, the coefficients can be calculated in a much shorter period of time (e.g., minutes or hours). Therefore, the methods and systems described herein can allow the coefficients to be recalculated at regular intervals, ensuring that the PAC is more up to date. In this way, the systems and methods according to example embodiments of the present disclosure can have a technical effect of simplifying and/or enhancing the updating of PAC for assessment of engine health in a more efficient manner Information can be collected to adjust the coefficients to a particular engine. For example, during a flight, an aerial vehicle can collect flight test data related to one or more engines. On landing, the flight test data can be transmitted to a ground system, transmitted to a cloud computing environment, and/or stored in one or more computing devices in the aerial vehicle. In another embodiment, a connection with a cloud computing environment can be maintained during flight and the flight test data can be transferred to the cloud computing environment in real-time or near real-time. The flight test data can be arranged by engine, by aerial vehicle, by fleet, by aggregating available flight test data, the like, and/or a combination of the foregoing.

The flight test data can be processed using a machine learning technique. A machine learning technique can include, for instance, a computer automated training process. The machine learning technique can be initialized with training data. The machine learning technique can create better models with updated flight test data. The machine learning technique can consider engine flight test data, aerial vehicle flight test data, fleet flight test data, an aggregation of available flight test data, the like, and/or a combination of the foregoing. The machine learning technique can be performed in the cloud computing environment, the ground system, the aerial vehicle, and/or a combination of the foregoing. The machine learning technique can include a Bayesian hybrid model, a neural network, the like, and/or a combination of the foregoing.

One or more coefficients can be determined as a result of the machine learning technique. If the one or more coefficients are determined in the ground system and/or the cloud computing environment, then the one or more coefficients can be transmitted to the aerial vehicle. The aerial vehicle can use the one or more coefficients in the PAC. The PAC can be used to check the engine health of the one or more engines.

When the aerial vehicle performs an additional flight, the flight test data from the additional flight can be collected. The flight test data from the additional flight can be transmitted to cloud computing environment and/or the ground system. The flight test data from the additional flight can be used by the machine learning technique to update the one or more coefficients. The one or more updated coefficients can be transmitted to the aerial vehicle. The aerial vehicle can update the PAC with the one or more updated coefficients. The aerial vehicle can use the updated PAC to check the engine health of the one or more engines. The PAC can be similarly updated with more coefficients based on more flight test data received after more flights. In this way, the systems and methods according to example aspects of the present disclosure have a technical effect of more efficiently determining more accurate and up-to-date information for predicting engine health.

FIG. 1 provides a perspective view of an example aircraft 10 in accordance with example embodiments of the present disclosure. The aircraft 10 defines an orthogonal coordinate system, including three orthogonal coordinate axes. More specifically, the three orthogonal coordinate axes include a lateral axis L, a transverse axis T, and a vertical axis V. In operation, the aircraft 10 may move along or around at least one of the lateral axis L, the transverse axis T, and the vertical axis V.

The aircraft 10 includes an airframe 12, a main rotor assembly 20, and a tail rotor assembly 30. The main rotor assembly 20 includes a main rotor hub 22. The main rotor assembly 20 includes a plurality of main rotor blades 24. As shown, each main rotor blade 24 extends outward from the main rotor hub 22. The tail rotor assembly 30 includes a tail rotor hub 32 and a plurality of tail rotor blades 34. Each tail rotor blade 34 extends outward from the tail rotor hub 32.

The aircraft 10 further includes a first gas turbine engine 40 and a second gas turbine engine 42. The first and/or second gas turbine engines 40, 42 generate and transmit torque to drive rotation of the main rotor blades 24 and/or the tail rotor blades 34. In particular, rotation of the main rotor blades 24 generates lift for the aircraft 10. Rotation of the tail rotor blades 34 generates thrust and counteracts torque exerted on the airframe 12 by the main rotor blades 24.

The first and second gas turbine engines 40, 42 can include sensors (not shown) for sensing data related to the first and second gas turbine engines 40, 42. The aircraft 10 can include a computing device (not shown). The computing device can store the sensed data related to the first and second gas turbine engines 40, 42, along with other data related to operation of the aircraft 10 (for example, data from a control unit (not shown)), as flight test data. The aircraft 10 can include a communication interface (not shown) for communicating with a ground system (not shown) and/or a cloud computing environment (not shown). The aircraft 10 can transmit information, such as the flight test data, to the ground system and/or the cloud computing environment via the communication interface. The aircraft 10 can receive information, such as one or more coefficients, from the ground system and/or the cloud computing environment via the communication interface. The computing device of the aircraft 10 can compute one or more coefficients. The computing device of the aircraft 10 can use the one or more coefficients as part of a model for predicting engine health called a power assurance check (PAC). The PAC can use parameters related to a current flight, such as, for example, temperature, and output an indication of engine health based on the parameters and the coefficients.

It should be appreciated that, although a particular helicopter has been illustrated and described, other configurations and/or aircraft, such as high speed compound rotary-wing aircraft with supplemental translational thrust systems, dual contra-rotating, coaxial rotor system aircraft, turbo-props, tilt-rotors, tilt-wing aircraft, conventional take-off and landing aircraft and other turbine driven machines will also benefit from the present disclosure.

Figure 2:
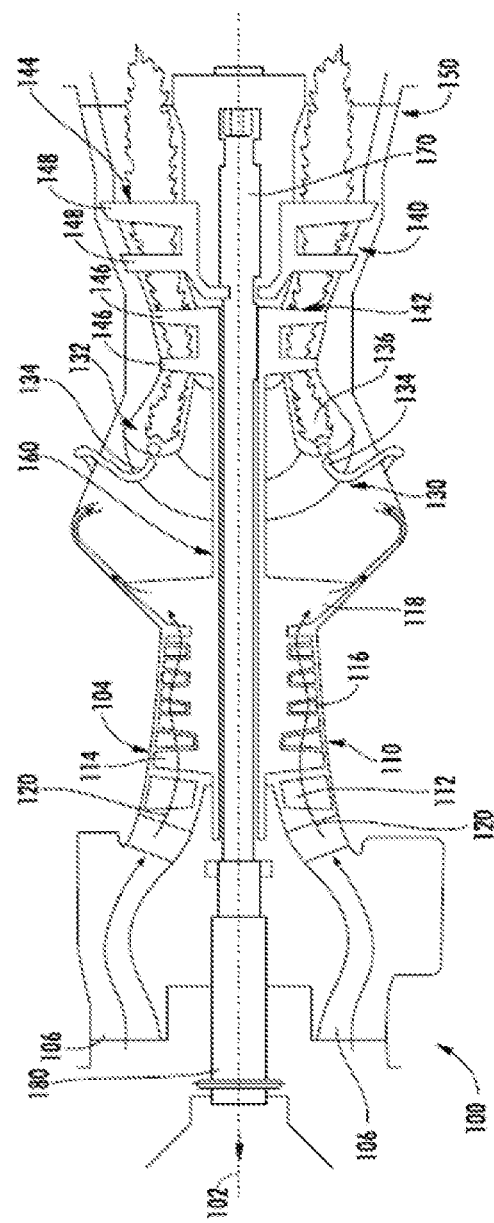
FIG. 2 is a schematic cross-sectional view of a gas turbine engine in accordance with one embodiment of the present disclosure.

FIG. 2 provides a schematic cross-sectional view of an example gas turbine engine 100 in accordance with the present disclosure. As shown in FIG. 2, the gas turbine engine 100 defines a longitudinal or centerline axis 102 extending therethrough for reference. The gas turbine engine 100 may generally include a substantially tubular outer casing 104 that defines an annular inlet 106. The outer casing 104 may be formed from a single casing or multiple casings. The outer casing 104 encloses, in serial flow relationship, a gas generator compressor 110, a combustion section 130, a turbine 140, and an exhaust section 150. The gas generator compressor 110 includes an annular array of inlet guide vanes 112, one or more sequential stages of compressor blades 114, one or more sequential stages of compressor vanes 116, and a centrifugal compressor 118. Collectively, the compressor blades 114, the compressor vanes 116, and the centrifugal compressor 118 define a compressed air path 120. The gas turbine engine 100 can include one or more sensors (not shown) for sensing information related to the gas turbine engine 100.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gas 136 drives the turbine 140.

The turbine 140 includes a gas generator turbine 142 and a power turbine 144. The gas generator turbine 142 includes one or more sequential stages of turbine rotor blades 146, and the power turbine 144 includes one or more sequential stages of turbine rotor blades 148. The gas generator turbine 142 drives the gas generator compressor 110 via a gas generator shaft 160, and the power turbine 144 drives an output shaft 180 via a power turbine shaft 170.

As shown in the embodiment illustrated in FIG. 2, the gas generator compressor 110 and the gas generator turbine 142 are coupled to one another via the gas generator shaft 160. In operation, the combustion gases 136 drives both the gas generator turbine 142 and the power turbine 144. As the gas generator turbine 142 rotates around the centerline axis 102, the gas generator compressor 110 and the gas generator shaft 160 both rotate around the centerline axis 102. Further, as the power turbine 144 rotates, the power turbine shaft 170 rotates and transfers rotational energy to the output shaft 180. As an example, the gas turbine engine 100 may be the first and second gas turbine engines 40, 42 of FIG. 1, and the output shaft 180 may rotate both the main and tail rotor blades 24, 34 of the aircraft 10.

Figure 3:
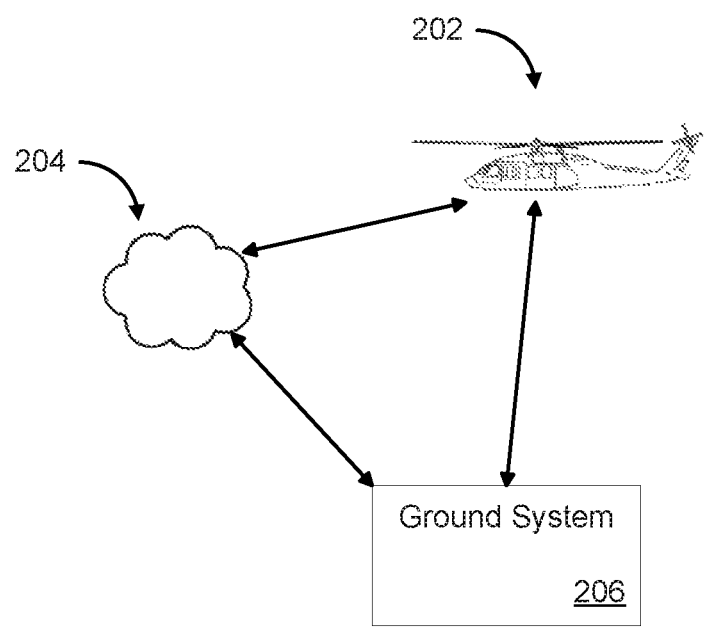
FIG. 3 depicts a block diagram of an example system according to example embodiments of the present disclosure.

FIG. 3 depicts a block diagram of an example system according to example embodiments of the present disclosure. A vehicle 202 can be in communication with a cloud computing environment 204 and/or a ground system 206. The cloud computing environment 204 can be in communication with the ground system 206. The vehicle 202 can be in communication with the ground system 206 via the cloud computing environment 204. The vehicle 202 can be in communication with the cloud environment 204 via the ground system 206. The cloud computing environment 204 can be in communication with the ground system 206 via the vehicle 202. The vehicle 202 can generate and provide flight test data.

The vehicle 202 can receive and use one or more coefficients for a power assurance check (PAC). The one or more coefficients can be determined using a machine learning technique, described below. A machine learning technique can include a computer automated training process. The machine learning technique can be performed at the cloud computing environment 204, at the ground system 206, at the vehicle 202, and/or distributed across one or more of the foregoing.

The machine learning technique can include a model trainer. The machine learning technique can implement the model trainer to train and/or re-train one or more models (e.g., neural networks, Bayesian hybrid models) such as multi-layer non-linear models (e.g., deep neural networks). As examples, the model trainer can perform back propagation techniques such as batch gradient descent or stochastic gradient descent to train the models. The model trainer can also leverage dropout techniques to combat model overfitting.

Thus, in some implementations, the machine learning technique can implement model trainer to train new models or update versions on existing models on additional measurement information. As an example, the model trainer can use measurement information hand-labeled as being desirable to train one or more models to provide outputs regarding the desirability of measurement information. In particular, in some implementations, the additional training data can be measurement information that a user entered through an editing interface. Thus, updated versions of the models of a particular engine can be trained by the model trainer on specialized data sets to better infer, capture, and store measurement information which can better reflect conditions experienced by the particular engine. In other instances, the additional training data can be aggregated user feedback.

In some embodiments, training data can include data provided by a manufacturer, such as engine acceptance test procedure (ATP) data. Training data can include flight test data for an engine, flight test data for a vehicle, flight test data for a fleet, and/or an aggregation of flight test data for a plurality of vehicles, etc.

The model trainer can include computer logic utilized to provide desired functionality. Thus, the model trainer can be implemented in hardware, firmware and/or software controlling a general purpose processor. In some implementations, the model trainer includes program code files stored on the storage device, loaded into memory and executed by processor or can be provided from computer program products, for example, computer executable instructions that are stored in a tangible computer-readable storage medium such as RAM hard disk or card or other computer-readable optical or magnetic media.

In one example implementation, systems and methods use a Bayesian Hybrid Model for engine modeling. More particularly, a data set can be collected that is indicative of operational conditions at one or more engines. For example, the data set can include data from various types of sensors, data collection devices, or other feedback devices that monitor conditions at the one or more engines or the vehicle as a whole. A plurality of features can be extracted from the data set. The data set can be fully or partially labeled. For example, labeling of data can be performed manually by human experts and/or according to known ground truth information during data collection. The data set can be used to train the Bayesian Hybrid Model in a process generally known as training. Expectations of operational conditions at the one or more engines based on the one or more models can be compared with the actual operation conditions indicated by the data collected.

The Bayesian Hybrid Model can be used to adjust parameters of a power assurance check (PAC), such as one or more coefficients. The adjusted one or more coefficients can be used to by the PAC in the vehicle 202 to predict engine health. In another embodiment, the one or more models, such as the Bayesian Hybrid Model, can generate a PAC and transmit the PAC to the vehicle 202. In such an embodiment, the vehicle 202 can transmit the collected to flight test data to the cloud computing environment 204. The cloud computing environment 204 can use the one or models to adjust the PAC and transmit the PAC to the vehicle 202. The vehicle 202 can use the transmitted PAC to predict engine health.

Figure 4:
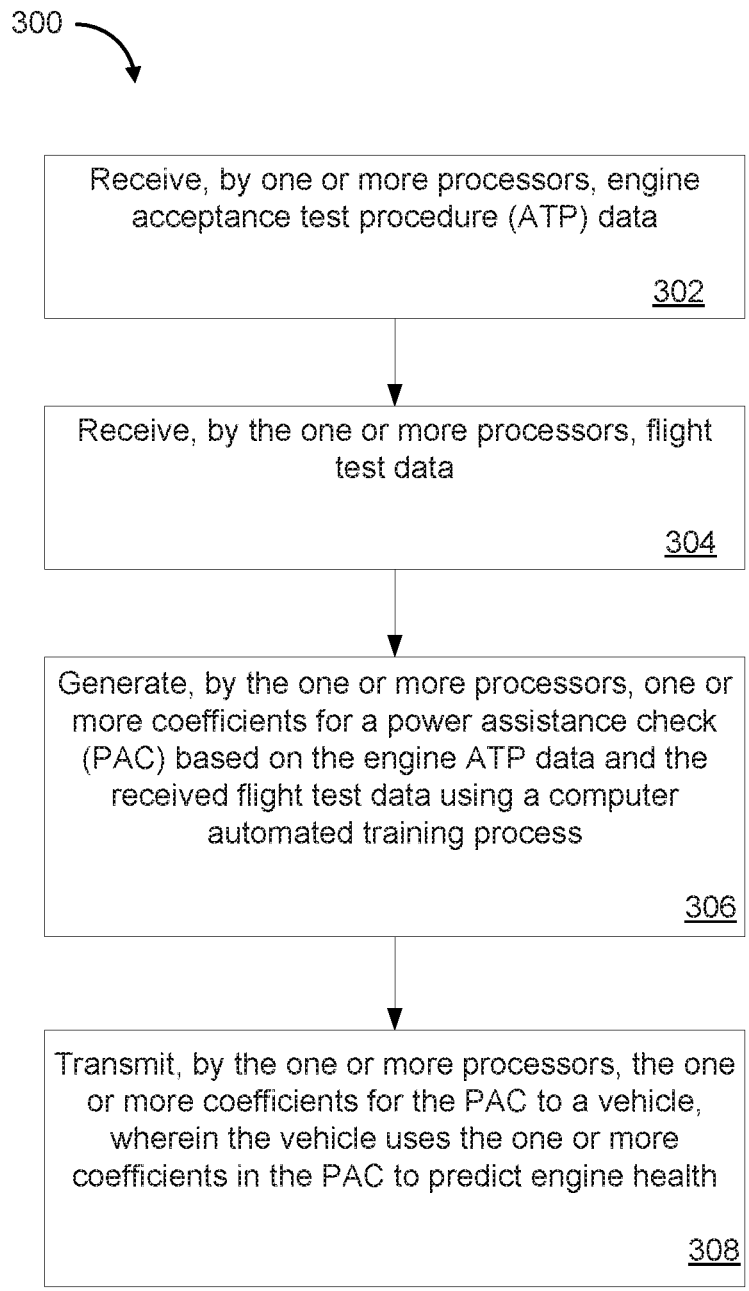
FIG. 4 depicts a flow diagram of an example method according to example embodiments of the present disclosure.

FIG. 4 depicts a flow diagram of an example method (300) for modeling engine health. The method of FIG. 4 can be implemented using, for instance, one or more cloud computing environments 204 of FIG. 3 and/or one or more ground systems 206 of FIG. 3. FIG. 4 depicts steps performed in a particular order for purposes of illustration and discussion. Those of ordinary skill in the art, using the disclosures provided herein, will understand that various steps of any of the methods disclosed herein can be adapted, modified, rearranged, or modified in various ways without deviating from the scope of the present disclosure.

At (302), engine acceptance test procedure (ATP) data can be received. For instance, the cloud computing environment 204 can receive engine ATP data. As another example, the ground system 206 can receive engine ATP data. The engine ATP data can be data provided by the engine manufacturer associated with various engine parameters and performance. The engine ATP data can be used as initial data related to an engine prior to use of the engine. In some embodiments, the ATP data can be associated with operating parameters such as engine performance, engine component performance, ambient temperature, pressure, engine torque, power turbine shaft rotational speed, engine measured turbine inlet temperature, and other parameters.

At (304), flight test data can be received. For instance, the cloud computing environment 204 can receive flight test data. As another example, the ground system 206 can receive flight test data. The flight test data can be specific to an engine. The flight test data can be specific to a vehicle. The flight test data can be specific to a fleet. The flight test data can be specific to an aggregation of a plurality of vehicles.

At (306), one or more coefficients can be generated (e.g., calculated, determined, etc.) based on the received engine ATP data and the received flight test data using a computer automated training process. For instance, the cloud computing environment 204 can generate one or more coefficients for a power assistance check (PAC) based on the engine ATP data and the received flight test data using a computer automated training process. In addition and/or in the alternative, the ground system 206 can generate one or more coefficients for a power assistance check (PAC) based on the engine ATP data and the received flight test data using a computer automated training process. The computer automated training process can be implemented at least in part by a Bayesian hybrid model. The computer automated training process can be implemented at least in part by a neural network. The PAC can correlate one or more parameters to a temperature margin.

At (308), the one or more coefficients for the PAC can be transmitted to a vehicle. For instance, the cloud computing environment 204 can transmit the one or more coefficients for the PAC to a vehicle. As another example, the ground system 206 can transmit the one or more coefficients for the PAC to a vehicle. The vehicle can use the one or more coefficients in the PAC to predict engine health. The flight test data can be specific to the vehicle. The vehicle can be a helicopter.

Optionally, additional flight test data can be received. For instance, the cloud computing environment 204 can receive additional flight test data. As another example, the ground system 206 can receive additional flight test data. The one or more coefficients can be updated (e.g., recalculated, refined, etc.) based on the additional flight test data. For instance, the cloud computing environment 204 can update the one or more coefficients based on the additional flight test data. As another example, the ground system 206 can update the one or more coefficients based on the additional flight test data. The one or more updated coefficients can be transmitted to the vehicle. For instance, the cloud computing environment 204 can transmit the one or more updated coefficients to the vehicle. As another example, the ground system 206 can transmit the one or more updated coefficients to the vehicle. The vehicle can use the one or more updated coefficients in the PAC.

Figure 5:
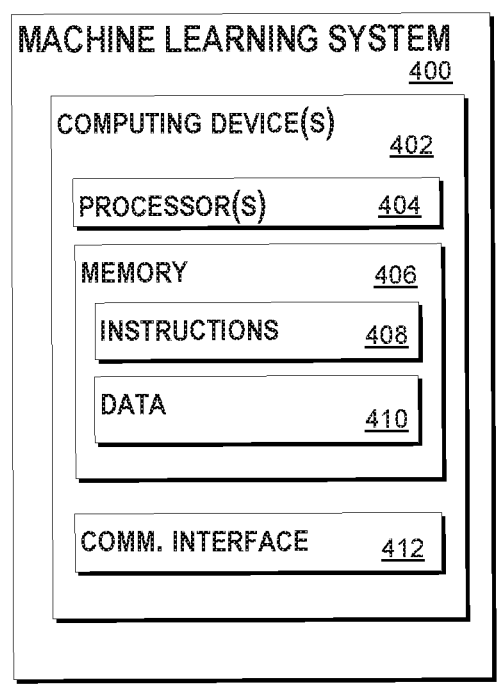
FIG. 5 depicts a computing system for implementing one or more aspects according to example embodiments of the present disclosure.

FIG. 5 depicts a block diagram of an example computing system that can be used to implement a machine learning system 400 according to example embodiments of the present disclosure. The machine learning system 400 can be implemented on one or more cloud computing environments 204 of FIG. 3, one or more ground systems 206 of FIG. 3, one or more vehicles 202 of FIG. 3, or a combination of the foregoing. As shown, the machine learning system 400 can include one or more computing device(s) 402. The one or more computing device(s) 402 can include one or more processor(s) 404 and one or more memory device(s) 406. The one or more processor(s) 404 can include any suitable processing device, such as a microprocessor, microcontroller, integrated circuit, logic device, or other suitable processing device. The one or more memory device(s) 406 can include one or more computer-readable media, including, but not limited to, non-transitory computer-readable media, RAM, ROM, hard drives, flash drives, or other memory devices.

The one or more memory device(s) 406 can store information accessible by the one or more processor(s) 404, including computer-readable instructions 408 that can be executed by the one or more processor(s) 404. The instructions 408 can be any set of instructions that when executed by the one or more processor(s) 404, cause the one or more processor(s) 404 to perform operations. The instructions 408 can be software written in any suitable programming language or can be implemented in hardware. In some embodiments, the instructions 408 can be executed by the one or more processor(s) 404 to cause the one or more processor(s) 404 to perform operations, such as the operations for modeling engine health, as described with reference to FIG. 4, and/or any other operations or functions of the one or more computing device(s) 402.

The memory device(s) 406 can further store data 410 that can be accessed by the processors 404. For example, the data 410 can include flight test data, engine acceptance test procedure (ATP) data, a navigational database, data associated with the navigation system(s), data associated with the control mechanisms, data indicative of a flight plan associated with the aircraft 10, data associated with geographic coordinates, and/or any other data associated with aircraft 10, as described herein. The data 410 can include one or more table(s), function(s), algorithm(s), model(s), equation(s), etc. for modeling engine health according to example embodiments of the present disclosure.

The one or more computing device(s) 402 can also include a communication interface 412 used to communicate, for example, with the other components of system. The communication interface 412 can include any suitable components for interfacing with one or more network(s), including for example, transmitters, receivers, ports, controllers, antennas, or other suitable components. The communication interface 412 can enable communication between the one or more cloud computing environments 204 of FIG. 3 and the one or more ground systems 206 of FIG. 3, between the one or more cloud computing environments 204 of FIG. 3 and the one or more vehicles 202 of FIG. 3, and between the one or more ground systems 206 of FIG. 3 and the one or more vehicles 202 of FIG. 3. Additionally, the communication interface 412 can enable communication between two or more cloud computing environments 204 of FIG. 3, between two or more ground systems 206 of FIG. 3, and between two or more vehicles 202 of FIG. 3.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for modeling engine health comprising:
receiving, by one or more processors, engine data;
receiving, by the one or more processors, flight test data;
initializing a machine learning technique based at least on training data comprising the engine data and the flight test data;
generating, by the one or more processors, one or more coefficients for a power assistance check (PAC) based on the engine data and the received flight test data using a computer automated training process comprising the machine learning technique;
transmitting, by the one or more processors, the one or more coefficients for the PAC to a vehicle, wherein the vehicle uses the one or more coefficients in the PAC to predict engine health; and
operating the engine based on the one or more coefficients in the PAC.

2. The method of claim 1, further comprising:
receiving, by the one or more processors, additional flight test data;
updating, by the one or more processors, the one or more coefficients based on the additional flight test data; and
transmitting, by the one or more processors, the one or more updated coefficients to the vehicle, wherein the vehicle uses the one or more updated coefficients in the PAC.

3. The method of claim 1, wherein the computer automated training process is implemented at least in part by a Bayesian hybrid model.

4. The method of claim 1, wherein the computer automated training process is implemented at least in part by a neural network.

5. The method of claim 1, wherein the flight test data is specific to an engine.

6. The method of claim 1, wherein the flight test data from the engine is specific to the vehicle.

7. The method of claim 1, wherein the PAC correlates one or more parameters to a temperature margin at the engine.

8. The method of claim 1, wherein the flight test data is associated with an aggregation of a plurality of vehicles.

9. The method of claim 1, wherein the one or more processors are in a cloud computing environment.

10. The method of claim 1, wherein the vehicle is a helicopter.

11. A system for modeling engine health comprising:
a memory device; and
one or more processors configured to:
receive engine acceptance test procedure (ATP) data;
receive flight test data;
initialize a machine learning technique based at least on training data comprising the engine ATP data and the flight test data;
generate one or more coefficients for a power assistance check (PAC) based on the engine ATP data and the received flight test data using the machine learning technique;
adjust, via a cloud computing environment, the one or more coefficients of the PAC;
transmit the one or more coefficients for the PAC from the cloud computing environment to a vehicle, wherein the vehicle uses the one or more coefficients in the PAC to predict engine health; and
operating the engine based on the transmitted coefficients.

12. The system of claim 11, the one or more processors further configured to:
receive additional flight test data;
recalculate, via the cloud computing environment, the one or more coefficients based on the additional flight test data; and
transmit the one or more recalculated coefficients to the vehicle, wherein the vehicle uses the one or more recalculated coefficients in the PAC.

13. The system of claim 11, wherein the machine learning technique is implemented at least in part by a Bayesian hybrid model.

14. The system of claim 11, wherein the machine learning technique is implemented at least in part by a neural network.

15. The system of claim 11, wherein the flight test data is specific to a fleet.

16. The system of claim 11, wherein the flight test data is associated with an aggregation of a plurality of vehicles.

17. An aerial vehicle comprising:
a memory device; and
one or more processors configured to:
accumulate flight test data during a flight;
initialize a machine learning technique based at least on training data comprising the flight test data;
transmit the flight test data to a cloud computing environment, wherein the cloud computing environment is configured to generate one or more coefficients for a power assistance check (PAC) based on the received flight test data using the machine learning technique;
receive the one or more coefficients;

predict engine health based on the one or more coefficients in the PAC; and operate an engine based on the one or more coefficients.

18. The aerial vehicle of claim 17, wherein the aerial vehicle is a helicopter.

19. The aerial vehicle of claim 17, wherein the flight test data is specific to the engine.

20. The aerial vehicle of claim 17, wherein the flight test data relates to all engines on the vehicle.

* * * * *